US 6,549,789 B1

(12) United States Patent
Kfoury (10) Patent No.: US 6,549,789 B1
(45) Date of Patent: Apr. 15, 2003

(54) PORTABLE ELECTRONIC DEVICE WITH AN ADAPTABLE USER INTERFACE

(75) Inventor: Tony N. Kfoury, Lisle, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/560,767

(22) Filed: Apr. 28, 2000

(51) Int. Cl.$^7$ .............................. H04B 1/38; H04Q 7/20
(52) U.S. Cl. ..................... 455/550; 455/556; 455/557; 455/566; 455/575; 455/90
(58) Field of Search .......................... 455/90, 566, 557, 455/556, 569, 575, 550, 552; 379/430; D14/137, 138, 377

(56) References Cited

U.S. PATENT DOCUMENTS

| | | | | |
|---|---|---|---|---|
| 4,488,146 A | * | 12/1984 | Burchart | 340/407 |
| 4,875,185 A | * | 10/1989 | Bornschein | 364/900 |
| 5,419,707 A | * | 5/1995 | Kelley | 439/21 |
| 5,485,517 A | * | 1/1996 | Gray | 379/433 |
| 5,533,097 A | * | 7/1996 | Crane et al. | 379/58 |
| 5,625,673 A | * | 4/1997 | Grewe et al. | 379/61 |
| 5,948,086 A | * | 9/1999 | Lin | 710/100 |
| 6,144,358 A | * | 11/2000 | Narayanaswamy et al. | 345/102 |
| 6,269,395 B1 | * | 7/2001 | Blatherwick et al. | 709/219 |

OTHER PUBLICATIONS

Web Page that has information which may be relevant to the current application. The date of publication is unknown and not ascertainable from the web page. http//www.strawberrycorporation.com/products/en_allitems.html The item under the customized category and labeled "New" "For Mobile–Phone(2–Axis)."

\* cited by examiner

*Primary Examiner*—Edward F. Urban
*Assistant Examiner*—Meless Zewdu
(74) *Attorney, Agent, or Firm*—Lawrence J. Chapa (57) ABSTRACT

A handheld electronic device comprising, a housing (200) including a first housing portion (202) and a second housing portion (204). The first housing portion contains at least two user interfaces (208, 504), and the second user interface includes at least one user interface (212). The two housing portions are coupled by a swivel hinge (214) that allows the two housing portions to rotate about a first axis (302) such that the housing fold together, and a second axis (304) perpendicular to the first axis, allowing the housings to rotate relative to one another. Each user interface (208, 504, 212) can be configured as an input device, output device, or combination thereof. Having multiple user interfaces allows the electronic device to operate in a plurality of modes. The user can adapt the housing by rotating the either of the two housing portions to the position associated with the desired operation mode.

27 Claims, 8 Drawing Sheets

PORTABLE ELECTRONIC DEVICE WITH AN ADAPTABLE USER INTERFACE

BACKGROUND OF THE INVENTION

The present invention relates to portable electronic devices. More particularly it relates to a portable electronic device having a user selectable combination of user interfaces.

Many handheld electronic devices incorporate a user interface to allow the user to either input or receive information or a combination thereof. Depending on the intended function of the device, the user interface is customized according to the functions needed to operate the device. Typically, the device includes a housing with one or more portions incorporating a user interface for allowing user input, and a second user interface for providing user output.

Handheld electronic devices are generally small and light weight, making them portable and easy to carry. As a result, they are highly function specific as they can only accommodate limited user interface capability. In addition, the general trend is to continue to decrease both the size and weight to make the devices more desirable to the consumer. However, at the same time, the devices are becoming more complex, adding features such as internet access, video displays and full text input. As a consequence, the increased complexity leads to increased device size, which is contrary to the desire to reduce device size and weight.

It is also desirable to manufacture multi-mode devices combining several existing handheld devices into one. At least one example of a multi-mode device is a radiotelephone combined with a personal digital assistant (PDA). Each device mode type however requires a unique user interface that compliments the functionality of the different mode types. This generally results in either a dimensionally larger device, incorporating more than one input device or an input device that is difficult to use because data entry buttons must necessarily be assigned multiple functions often leading to confusion and increased complexity of operation.

Another issue with handheld electronic devices is that protection of the user interface is necessary to sustain proper functionality and insure longevity of the device. For example, user output devices are typically covered by a lens to protect the output device and at the same time allow the device to be esthetically pleasing. Lenses though are generally highly susceptible to abrasion potentially leaving the surface scratched or blemished. User interfaces generally include keypad buttons as a part of the input portion of the device. The buttons are typically exposed while not in use and may be damaged rendering them inoperable or the buttons may accidentally be depressed resulting in undesired operation of the device. Some methods of protection include providing a separate cover for the device when it is not in use. This adds cost to the device as well as requiring the user to carry multiple, cumbersome accessories. Another method is to design the device to fold onto itself, such that the display and input device are facing one another enclosing them on the inside of the device when it is in a closed position.

A further issue involves recent changes to the Federal Communication Commission (FCC) rules and regulations requiring telecommunication equipment and services to provide access to persons with disabilities when it is readily achievable to do so. This presents several problems for equipment manufactures. First, multiple disabilities need to be accommodated for, and generally in relatively small volumes. Second, the size of portable devices present dimensional limitations, limiting the number of user interfaces available or limiting the user interface capability. This causes problems as manufacture's will need to have several tools to accommodate several different models each incorporating a different access technology. As a result, smaller production runs will be necessary increasing the cost of manufacturing. Another alternative may be to increase the size of a device in order to include the required capability, but again this is contrary to the desired size and weight reduction and adding unwanted cost.

Accordingly, there is a need to improve the adaptability of user interfaces in portable electronic devices allowing multi-mode operation and disability access while reducing manufacturing time and cost.

DESCRIPTION OF THE PREFERRED EMBODIMENT

A handheld electronic device such as a cellular radiotelephone includes two housing portions. A first housing portion comprises at least two user interfaces and a second housing portion contains at least one user interface. The device incorporates a swivel hinge coupling the two housing portions together allowing the housing portions to rotate about a first axis such that the two housings can fold together or apart and at the same time rotate about a second axis allowing the housing portions to rotate relative to one another. This allows the multiple user interfaces of the first housing portion to rotatably align with the user interfaces of the second housing portion. Each user interface may be selectively adapted to operate in an inactive operation mode, an input operation mode, an output operation mode or a combination thereof. The user interfaces may be detachable from its associated housing portion allowing different types of user interfaces to be integrated into the electronic device. This permits an electronic device to be sold with a detachable user interface selected from plurality of user interfaces types. They may be sold separately from the electronic device itself or packaged with the device. This allows multiple combinations to be sold by packaging the device with a certain user interface. The user can easily customize the electronic device to meet that individual's need or as new types of user interfaces become available, the user may easily upgrade the electronic device by substituting the new user interface for the old thereby enhancing the product and improving its operability. The user may also want to change the mode of operation of the device by purchasing a new user interface for the device. For example, a user may want to add personal digital assistant (PDA) capability to their existing radiotelephone The PDA requires a larger display than the radiotelephone in order to view the pertinent information. Current radiotelephones require a small display as typically only a phone number and other minimal information needs to be displayed. Existing devices having this combination require complex user interfaces and large and heavy housings The present invention allows the user to easily install the new user interface with PDA operation mode capability and now the device has the additional capability of a PDA. The swivel hinge allows the user to rotate the housing portions to adapt the device to either the PDA or the radiotelephone mode. This is just but one example of mode combinations possible, other potential modes may include a wireless internet terminal, a pager, a calculator, or a hearing or vision impaired input and output device. Having multiple user interfaces in one device allows simple operation and maintains the size and weight requirements desired by the consumer.

Figure 1:
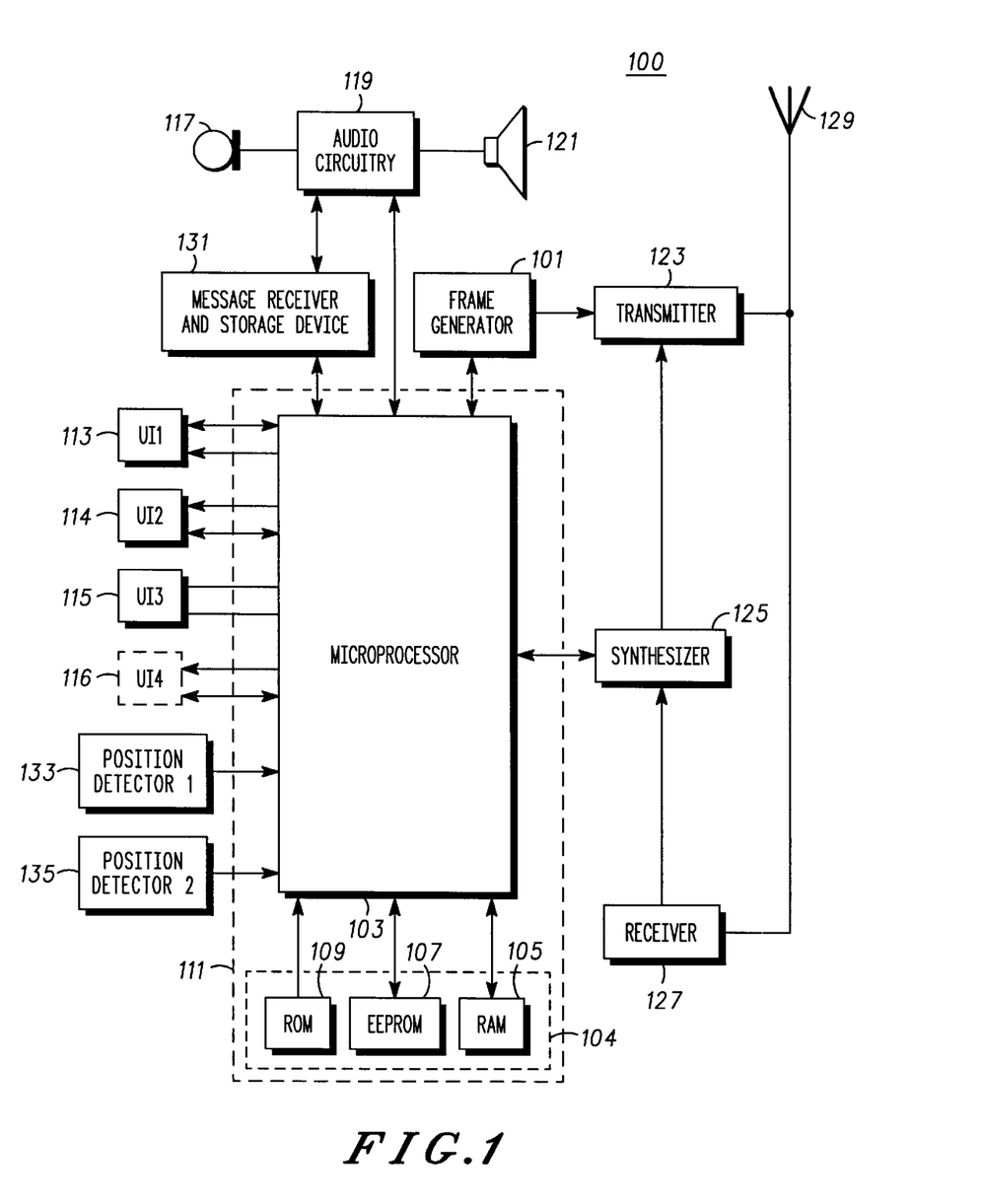
FIG. 1 is a block diagram of the handheld radiotelephone in accordance with the preferred embodiment of the present invention.

Turning to FIG. 1, a block diagram of a wireless communication device such as a cellular radiotelephone incorporating the present invention is shown. In the preferred embodiment, a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the wireless communication device, such as reading and or writing to a first user interface 113, second user interface 114, a third user interface 115, or a fourth user interface 116, according to the present invention, or controlling a frequency synthesizer 125. ASIC 101 processes audio transformed by audio circuitry 119 from a microphone 117 and to a speaker 121.

A transceiver processes the radio frequency signals. In particular, a transmitter 123 transmits through an antenna 129 using carrier frequencies produced by a frequency synthesizer 125. Information received by the communication device's antenna 129 enters the receiver 127 that demodulates the symbols using the carrier frequencies from frequency synthesizer 125. The communication device may optionally include a message receiver and storage device 130 including digital signal processing means. The message receiver and storage device could be, for example, a digital answering machine or a paging receiver.

In the present embodiment the microprocessor 103 is used to control the first user interface 113, second user interface 114, third user interface 115, and fourth user interface 116. The microprocessor 103 may also receive input from one user interface to control the operation thereof or control the operation of another user interface. In the preferred embodiment of the present invention there are three operation modes: a first operation mode which is an inactive mode, a second operation mode which is a user input mode, and a third operation mode which is a user output mode. The controller 103 can control the appropriate user interface to enter a desired operation mode or combination thereof based on the position of the first housing portion relative to the second housing portion or based on user input commands. The microprocessor may further receive signals from a first position sensor 133 indicating whether the housing is in the open or closed position or a second position sensor 135 indicating the rotation position of the first housing portion 202 relative to the second housing portion 204.

Turning to FIGS. 2 to 7, the handheld electronic device 100 has two housing portions, a first housing portion 202 and a second housing portion 204. Each housing portion has at least two faces. The face of the housing portion is a substantially flat surface that is large enough to accommodate some form of user interface. In the preferred embodiment of the present invention, each housing portion has a pair of opposing faces; the first housing portion 202 has a first face 206 and a second face 502, and the second housing portion 204 has a third face 210 and a fourth face 602. Mounted within the first housing portion 202 and accessible on the first face 206 is a first user interface 208. A second user interface 504 is also mounted within the first housing portion 204 and accessible on the second face 502. A third user interface 212 is mounted within the second housing portion 202 and accessible from the third face 210. In addition, a fourth user interface (not shown) may be added to the second housing portion 204, accessible on the fourth face 602 of the second housing portion 204.

Figure 3:
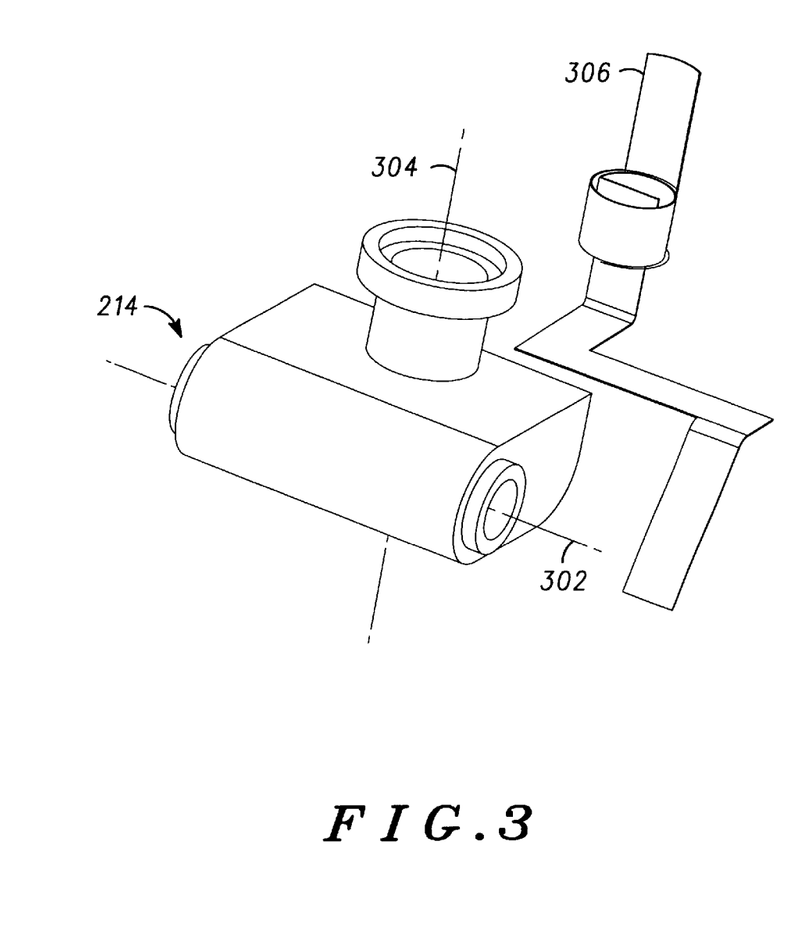
FIG. 3 is a perspective view of the swivel hinge and flexible circuit of electronic device according to the present invention of the preferred embodiment.
Figure 4:
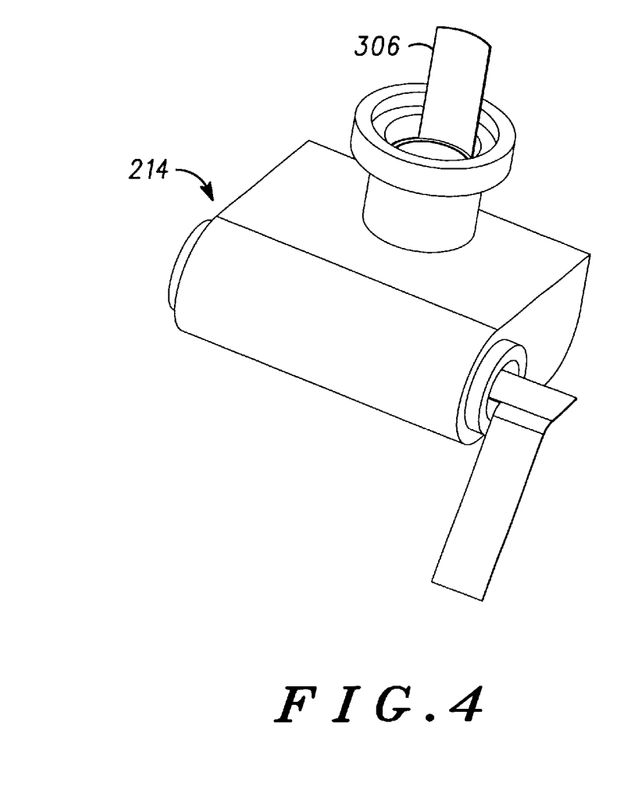
FIG. 4 is a perspective view of the flexible circuit inserted into the swivel hinge of the electronic device according to the present invention of the preferred embodiment.
Figure 5:
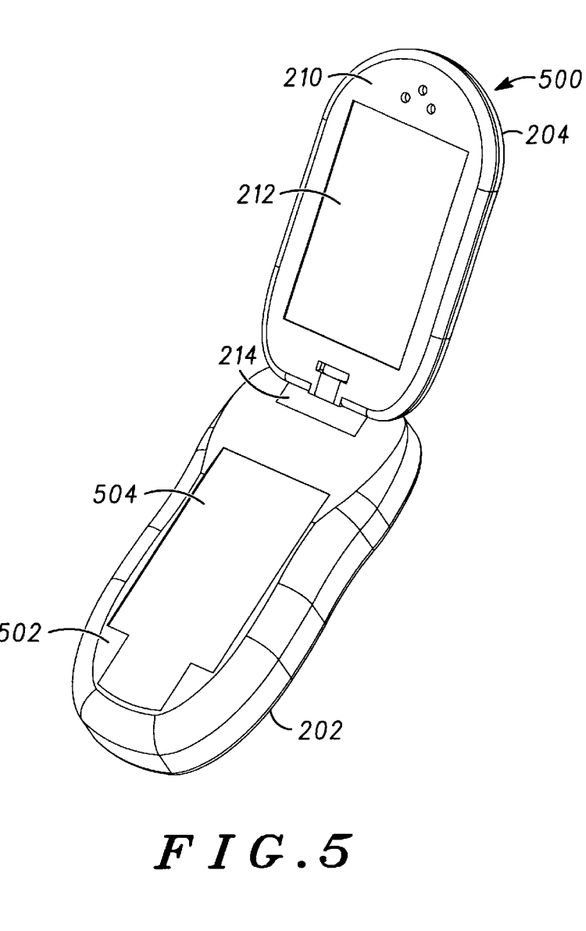
FIG. 5 is a perspective view of the handheld radiotelephone in the second open position according to the present invention of the preferred embodiment.
Figure 9:
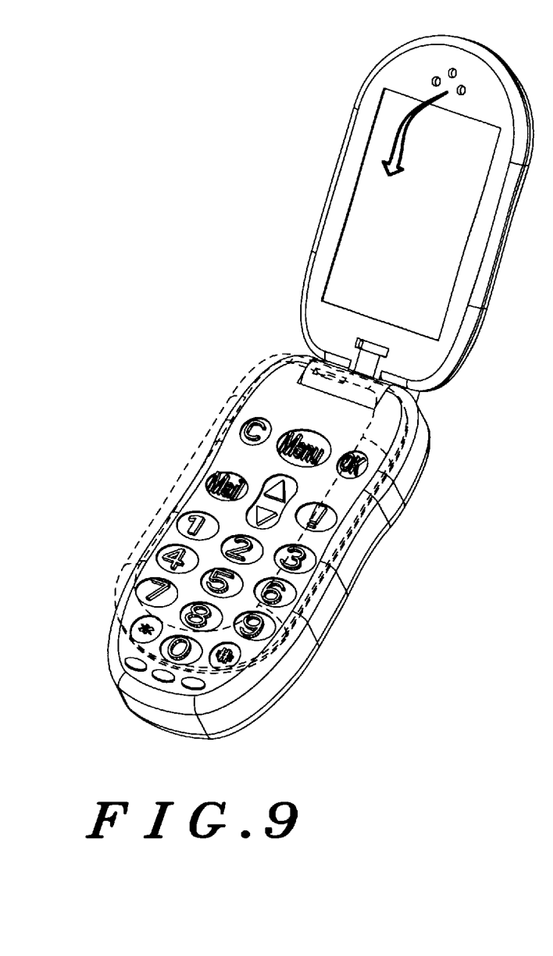
FIG. 9 is a perspective view of the handheld radiotelephone showing the folding together of the first housing portion and the second housing portion about the first axis of the swivel hinge according to the present invention of the preferred embodiment.

The housing portions are coupled end to end by a swivel hinge 214 depicted in FIGS. 3 and 4. The swivel hinge allows the first housing portion 202 and the second housing portion 204 to fold together in a clam shell fashion, rotating about a first axis 302 the swivel hinge 214. This rotation about the first axis 302 of the swivel hinge 214 is shown in FIG. 9. The first axis 302 allows the second housing portion 204 to rotate from a closed position to an open position. In the closed position, the first housing portion 202 and the second housing portion 204 are planarly adjacent such that the device is folded in half. In the open position the first housing portion 202 is angularly displaced at an angel between 90 and 180 degrees.

Also shown in FIGS. 3 and 4 is a flex circuit 306 that electrically connects a first electronic portion in the first housing portion and a second electronic portion in the second housing portion and is routed through the swivel hinge 214. The flex circuit 306 is extremely malleable allowing it to bend and flex and maintain continuous continuity while the shape of the flex circuit 306 allows it to fit within the swivel hinge 214. A constant electrical connection between the first electronic portion and the second electronic portion can therefore be maintained during the swiveling from position to position of the first and second housing portions. FIG. 3 shows the flex circuit outside of the swivel hinge 214 while FIG. 4 shows the flex circuit inside the swivel hinge 214.

Figure 8:
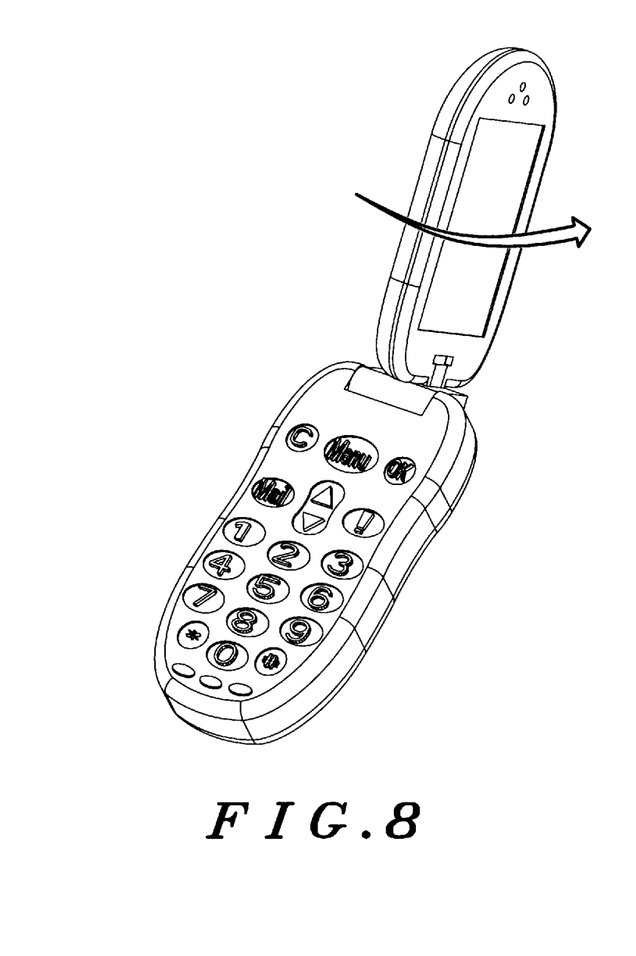
FIG. 8 is a perspective view of the handheld radiotelephone showing the swivel motion of the first housing portion relative to the second housing portion about the second axis of the swivel hinge according to the present invention of the preferred embodiment.

A second axis 304 of the swivel hinge 214 allows the first housing portion 202 to advantageously rotate relative to the second housing portion 204 in a swiveling motion as shown in FIG. 8. This allows the first housing portion 202 to adaptably rotate to a first housing portion first rotation position, and a first housing portion second rotation position relative to said second housing portion 204. This advantageously allows one device to have multiple user interfaces within the two housing portions and further allows the user to align the user interfaces in multiple combinations giving the device increased functionality as each interface provides a different mode of operation without increasing the complexity of the device. The swivel hinge 214 further allows the second housing portion 204 to rotate from a second housing portion first rotation position to a second housing portion second rotation position, relative to the first housing portion 202.

Figure 10:
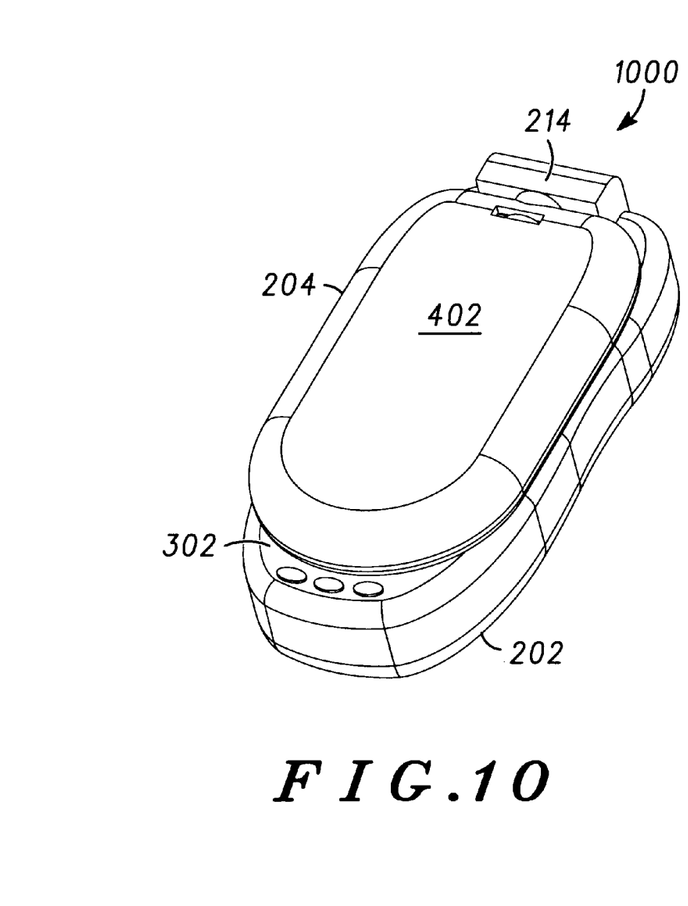
FIG. 10 is a perspective view of the handheld radiotelephone in the first closed position according to the present invention of the preferred embodiment.
Figure 11:
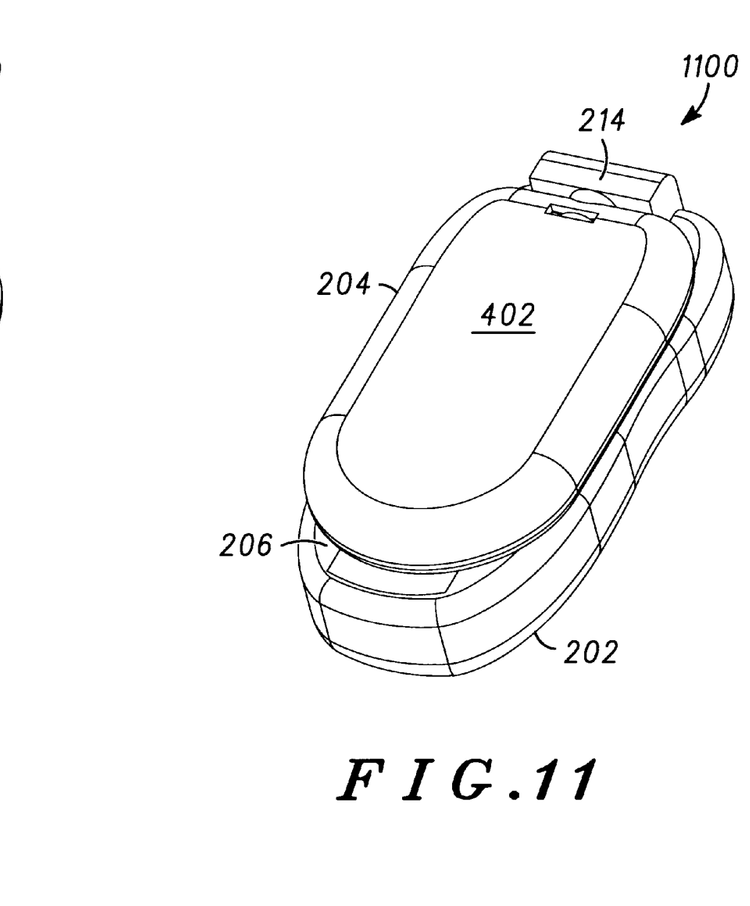
FIG. 11 is a perspective view of the handheld radiotelephone in the second closed position according to the present invention of the preferred embodiment.

The combination of the first axis 302 with the second axis 304 into one coupling is highly beneficial as it allows a plurality of user interface combinations. For example, in the preferred embodiment of the present invention the first housing portion 202 in the first housing portion first rotation position and the second housing portion in the second housing portion first rotation position, aligns the first user interface 208 with the third user interface 212 while the device is in a closed or open position. In a first closed position, Shown in FIG. 10, with this user interface alignment, the first user interface 208 is adjacent to the third user interface 212 and enclosed between the first housing portion 202 and the second housing portion 204. In this position, both user interfaces 208, 212 would be in the inactive operation mode when the user is not using the device.

However, the device itself could still be powered on and in a monitoring mode. Depending on the device mode, it may be waiting for an incoming signal. If the device is a radiotelephone, as in the preferred embodiment of the present invention, the device would monitor the cellular telephone system for incoming call signals. If the device is a PDA, data transmissions in the form of web pages or other information of the like may be received. In the first closed position FIG. 10 the first user interface and the third user interface would be protected between the two housing portions while the device remains powered on. When an incoming phone call is received and the user alerted to the call, the device may be unfolded by rotating the two housing portions apart about the first axis 302 to the first open position, FIG. 2 so that the first housing portion and the second housing portion are angularly displaced. This is considered the normally closed position and is therefore used when the device is not in use protecting the user interfaces from damage.

Figure 2:
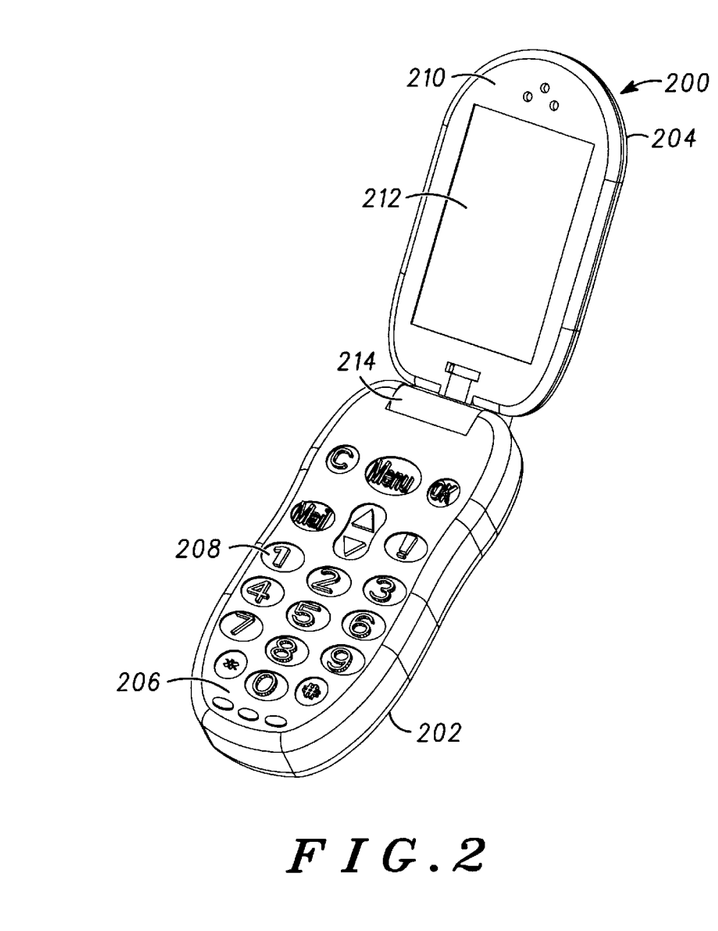
FIG. 2 is a perspective view of the handheld radiotelephone in the first open position according to the present invention of the preferred embodiment.
Figure 6:
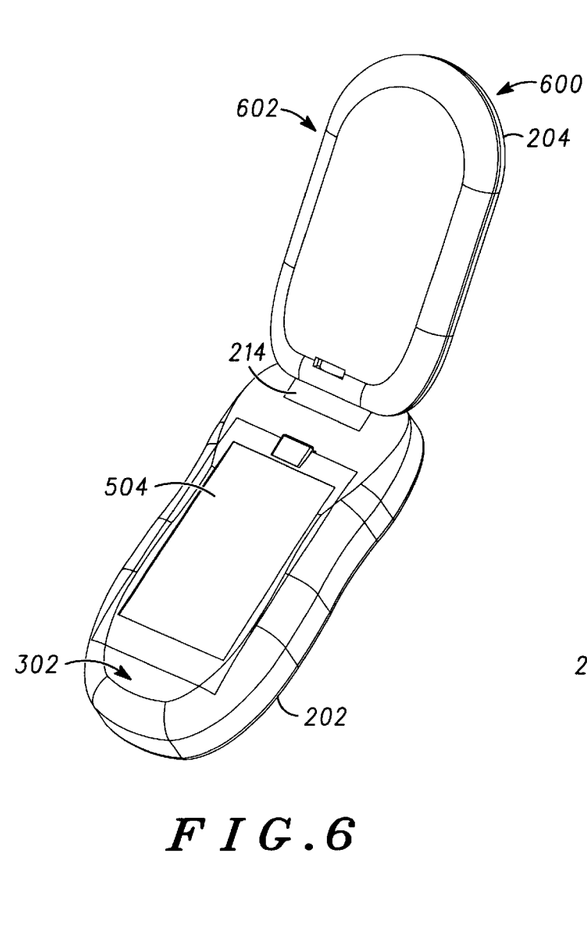
FIG. 6 is a perspective view of the handheld radiotelephone in the third open position according to the present invention of the preferred embodiment.
Figure 13:
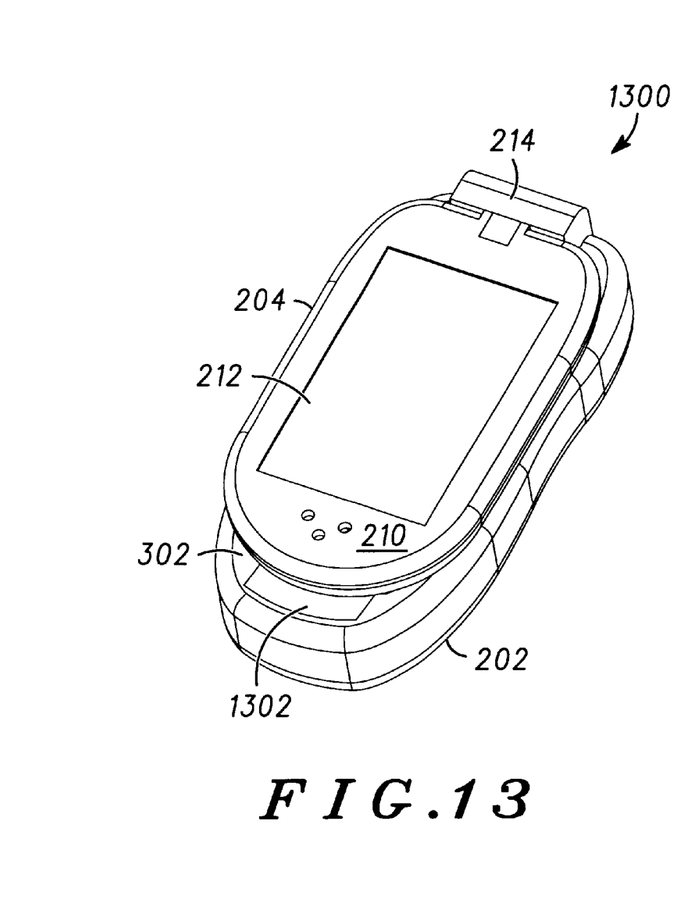
FIG. 13 is a perspective view of the handheld radiotelephone in the fourth closed position according to the present invention of the preferred embodiment.

While in the first open position FIG. 2, having the first housing portioned 202 in the first housing portion first rotation position and the second housing portion 204 in the second housing portion first rotation position, the second housing portion 204 may be rotated, relative to the first housing portion 202, to the second housing portion second rotation position putting the housing in the third open position FIG. 6. Subsequently, from the third open position FIG. 6, the device may be folded into a third closed position as shown in FIG. 13. In the third closed position FIG. 13, the first user interface 208 is enclosed between the first housing portion 202 and the second housing portion 204, while the third user interface 212 is on the outside of the device accessible to the user.

In the third closed position FIG. 13, the first user interface may extend beyond the second housing portion 204 such that a third closed position accessible portion 1302 of the first user interface is accessible to the user. The combination of the third closed position accessible portion 1302 and the exposed third user interface 212 allows the user to affect the operation of the third user interface 212 by the third closed position accessible portion 1302 of the first user interface 208.

Figure 7:
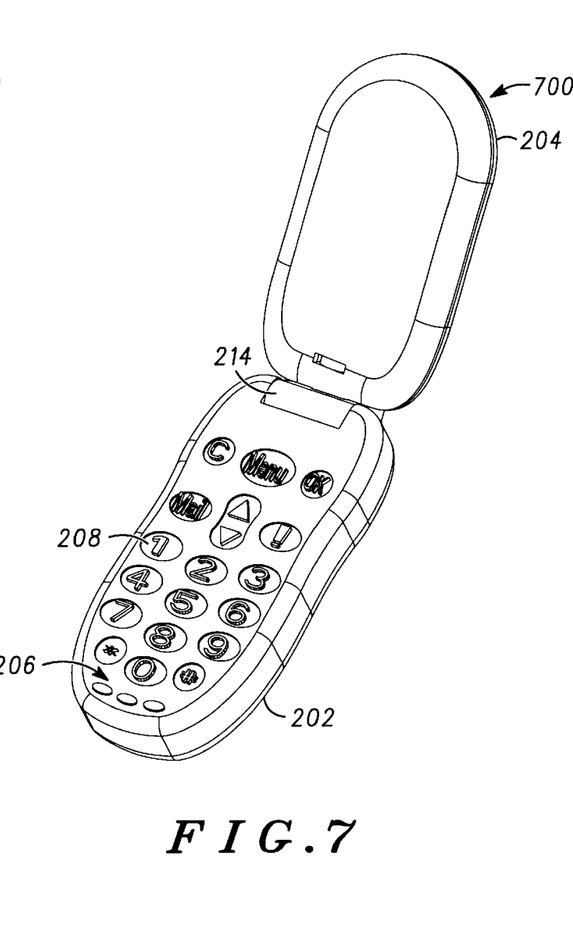
FIG. 7 is a perspective view of the handheld radiotelephone in the fourth open position according to the present invention of the preferred embodiment.
Figure 12:
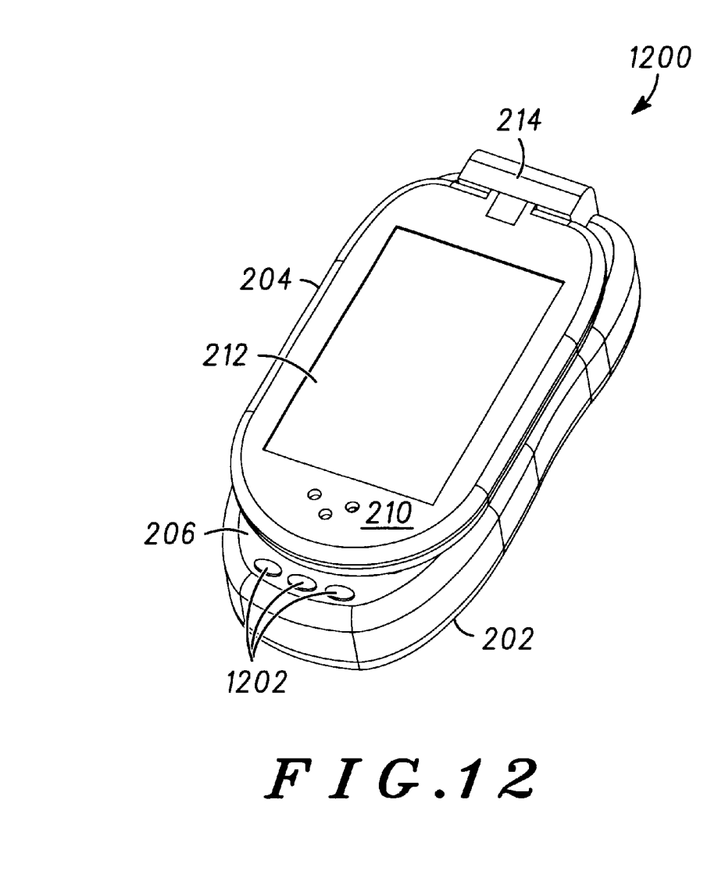
FIG. 12 is a perspective view of the handheld radiotelephone in the third closed position according to the present invention of the preferred embodiment.

The present invention may further be rotated to a fourth open position shown in FIG. 7. In the fourth open position FIG. 7, having the first housing portioned 202 in the first housing portion second rotation position and the second housing portion 204 in the second housing portion second rotation position, the second housing portion 204 may be folded into a fourth closed position as shown in FIG. 12. In the fourth closed position FIG. 12, the second user interface 504 is enclosed between the first housing portion 202 and the second housing portion 204, while the third user interface 212 is on the outside of the device accessible to the user.

In the fourth closed position FIG. 12, the second user interface 504 may extend beyond the second housing portion 204 such that a fourth closed position accessible portion 1302 of the second user interface 504 is accessible to the user. The combination of the fourth closed position accessible portion 1302 and the exposed third user interface 212 allows the user to affect the operation of the third user interface by the fourth closed position accessible portion 1302 of the second user interface 212. The fourth closed position accessible portion 1302 may include navigation buttons for web page control or menu navigation, or a power button to turn the device on or off, or other buttons of the like.

When rotating the device from position to position detectors mounted within the first housing portion and coupled to the microprocessor 103, provide housing position information thereto. In the case of the preferred embodiment of the present invention, the detector is a reed switch. The reed switch is closed, therefor completing the circuit when a magnet is place adjacent thereto. A first detector 228 is located in the first housing portion 202 at the end longitudinally opposite the swivel hinge 214. A first magnet 222 is located in the second housing portion 204, longitudinally opposite the swivel hinge 214 and aligned with the first detector 228 such that the first magnet 222 becomes substantially adjacent to the first detector 228 when the housing is rotated to the first, second, third or fourth closed positions FIG. 10, FIG. 11, FIG. 12, FIG. 13 respectively. In response to the magnet activating the first detector, a first position signal is sent to the microprocessor 103. Based on the first position signal the microprocessor 103 sends a signal to the appropriate user interface in accordance with the programmed operation mode of the device.

Further comprised in the preferred embodiment of the present invention is a second detector 226. The second detector 226 is located in the first housing portion 202 along the first axis of the swivel hinge 214. A second magnet 224 is located in the second housing portion 204, such that when the second housing portion 204 is in the second housing portion first rotation position, the second magnet 224 aligns with the second detector 228. The close proximity of the second magnet 224 to the second detector 228 activates the second detector 228 providing a second position signal to the microprocessor 103. Based on the second position signal and the first position signal, the microprocessor 103 sends a operating mode signal to the appropriate user interface in accordance with the programmed operation modes available in the device.

Figure 14:
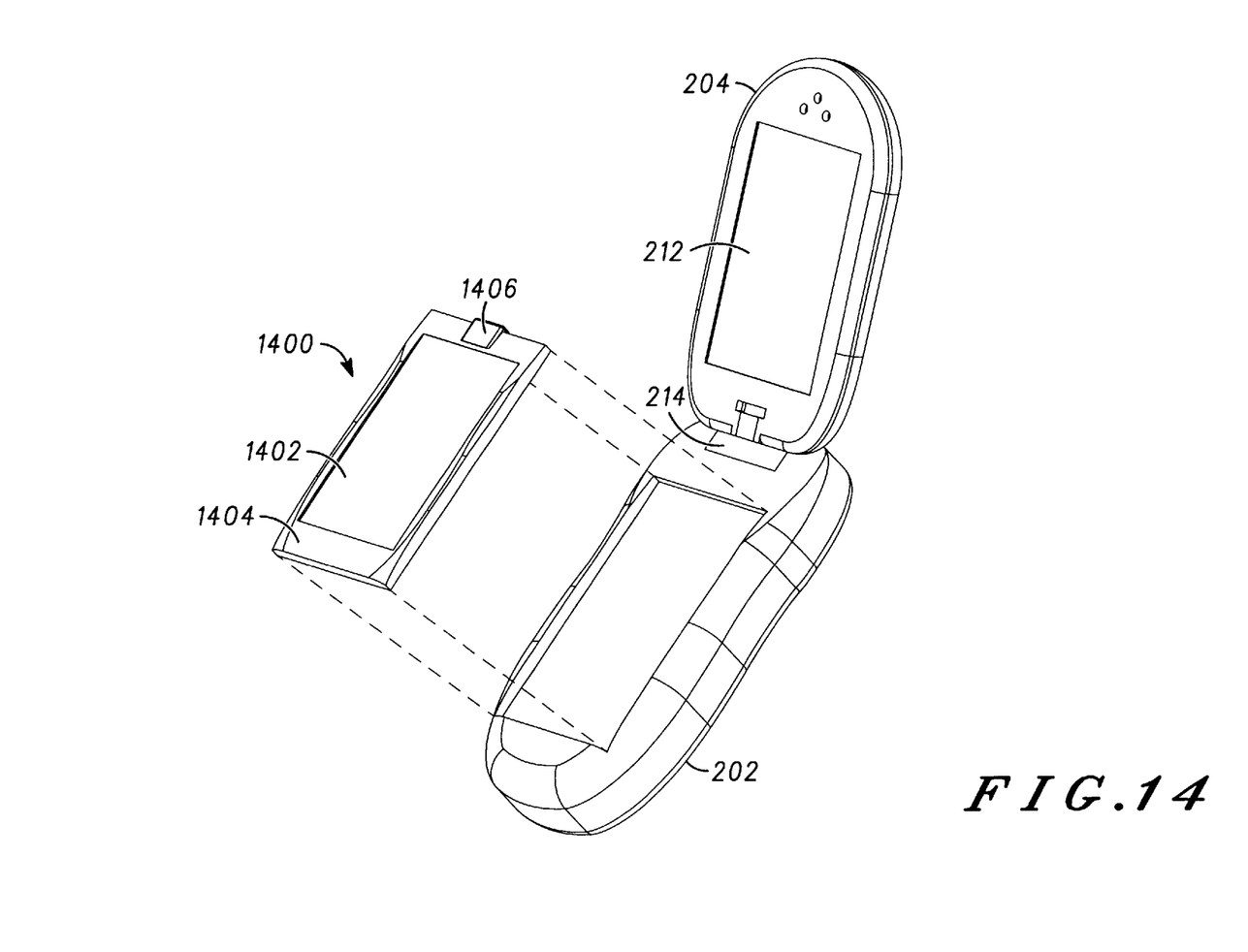
FIG. 14 is an exploded view of the handheld radiotelephone showing the detachable user interface according to the present invention of the preferred embodiment.

Even Further, the preferred embodiment of the present invention incorporates a detachable user interface 1400 as shown in FIG. 14. In the case of the present invention, the detachable user interface serves two purposes: a user interface 1402 of multiple types and modes, and a battery door 1404 for coupling to the first housing portion 202. The battery door is secured to the first housing portion 202 by latch 1406. The user interface 1402 mounted within the battery door is coupled to a first interconnect means 1208 located on the opposite side of the detachable user interface 1400. The first interconnect means 1208 aligns with a second interconnect means 1210 mounted to the first housing portion 202 such that when the detachable user interface is secured to the first housing portion 202 the first interconnect means makes electrical contact with the second interconnect means. This provides multiple electrical links from the user interface 1402 of the detachable user interface 1400 to the microprocessor 103 for control thereof.

Having multiple user interfaces allows for multiple modes of operation within a single handheld device. The detachable user interface further allows the manufacture to easily market devices with in a plurality of combinations. For instance one device can be manufactured and then simply packag4ed with a detachable user interface that is directed to a certain consumer. This significantly reduces the cost to the manufacture by postponing the customization of the device until the packaging stage. The device itself must only necessarily be manufactured to accommodate the different detachable user interfaces. The detachable user interface can now be manufactured to accommodate smaller consumer markets such as providing access to the disabled. User interfaces may easily be manufactured to accommodate the vision and hearing impaired and either sold separately or combined with the product in the packaging stage.

For example, vision impaired output device may include a Braille output device or a display that has very large fonts and icons that are easily identifiable. Another example may be to increase the button size which could accommodate both vision impaired and the dexterity impaired. User interfaces that accommodate hearing impaired may also be adapted to the detachable user interface. Examples include an enhanced loudspeaker, TTY, or more visual icons and cues to alert the user.

Even Further a detachable user interface may be a touch pad, full-text mini keyboard, remote control unit for home audio. The device may also be an output device to operate in conjunction with the third user interface. In the preferred embodiment of the present invention incorporates a detachable user interface into the batter door. Removing the detachable user interface allows for replacement of the battery pack.

Although the invention has been described and illustrated in the above description and drawings, it is understood that this description is by way of example only and that numerous changes and modifications can me made by those skilled in the art without departing from the true spirit and scope of the invention. For example, although one device includes three user interfaces, more may be included. The invention is not limited by the type of user interface and may include other types that the user desires Although the present invention finds particular use in portable cellular radiotelephones, the invention could be applied to any wireless communication device, including pagers, electronic organizers, and computers as well. Applicant's invention should be limited only by the following claims.

We claim:

1. A handheld radiotelephone comprising:
   a housing having a first housing portion and a second housing portion, said first housing portion having a first and second face, and said second housing portion having a third and fourth face;
   a first user interface mounted within said first housing portion and accessible on said first face;
   a second user interface mounted within said first housing portion and accessible on said second face;
   a third user interface mounted within said second housing portion accessible on said third face; and
   a swivel hinge for coupling said first housing portion to said second housing portion such that said first housing portion and said second housing portion rotate about a first axis of said swivel hinge between a first closed position, where said first housing portion and said second housing portion are folded together until they are planarly adjacent enclosing said first and said third user interface therebetween, and a first open position where said first and said second housing portions are angularly displaced about said first axis from said first closed position to an angle between 90 and 180 degrees, and wherein said swivel hinge further couples said first housing portion and said second housing portion such that said first and said second housing portions rotate about a second axis of said swivel hinge perpendicular to said first axis between a first housing portion first rotation position and a first housing portion second rotation position, as defined relative to said second housing portion, and between a second housing portion first rotation position and a second housing portion second rotation position as defined relative to said first housing portion, and
   wherein said first housing portion in said first housing portion second rotation position, and said second housing portion in said second housing portion first rotation position rotate about said first axis of said swivel hinge between a second closed position where said first housing portion and said second housing portion are folded together until they are planarly adjacent enclosing said second and said third user interface therebetween, and a second open position wherein said first and said second housing portions are angularly displaced from said second closed position about said first axis to an angle between 90 and 180 degrees.

2. The handheld radiotelephone of claim 1, wherein said first housing portion in said first housing portion first rotation position and said second housing portion in said second housing portion second rotation position, rotate about said first axis of said swivel hinge between a third closed position such that said first housing portion and said second housing portion are folded together until they are planarly adjacent enclosing only said first user interface therebetween.

3. The handheld radiotelephone of claim 1, wherein said first housing portion, in said first housing portion second rotation position and said second housing portion in said second housing portion second rotation position, rotate about said first axis of said swivel hinge between a fourth closed position such that said first housing portion and said second housing portion are folded together until they are planarly adjacent enclosing only said second user interface therebetween, and rotating to a fourth open position wherein said first and said second housing portions are angularly displaced from said fourth closed position about said first axis to an angle between 90 and 180 degrees.

4. The handheld radiotelephone according to claim 1, further comprising a controller coupled to said first user interface, said second user interface, and said third user interface, for generating and providing an operation mode signal thereto for control thereof in a first operation mode, a second operation mode and a third operation mode.

5. The handheld radiotelephone according to claim 4, wherein said first operation mode is an inactive mode, and wherein said second operation mode is an input user interface mode, and wherein said third operation mode is an output user interface mode.

6. The handheld radiotelephone according to claim 4, further comprising:
   a first position detector for generating a first position signal for indicating whether said housing is in said first housing first rotation position or said first housing second rotation position, and coupled to said controller for providing said first position signal thereto, and
   a second position detector for generating a second position signal for indicating whether said housing is in said first, said second, said third, or said fourth closed position, and coupled to said controller for providing said second position signal thereto.

7. The handheld radiotelephone according to claim 4, wherein said controller receives a user selectable operating mode selection signal generated by said first user interface, second user interface, or third user interface to define the operating mode of said first, said second, said third, or said fourth user interface.

8. The handheld radiotelephone according to claim 3, further comprising a controller coupled to said first user interface, said second user interface, and said third user interface, for generating and providing an operation mode signal thereto for control thereof in a first operation mode, a second operation mode and a third operation mode, and
   wherein said third user interface operates in said second operating mode or said third operating mode or a combination thereof as defined by said operation mode signal, when said housing is in said third or said fourth closed position, and
   wherein said first operation mode is an inactive mode, and wherein said second operation mode is an input user interface mode, and wherein said third operation mode is an output user interface mode.

9. The handheld radiotelephone according to claim 8, wherein said second housing portion partially covers said first user interface in said first and said third closed position to define a first closed position accessible portion and a third closed accessible portion thereof and a first closed position inaccessible portion and a third closed position inaccessible portion thereof, and wherein said second housing portion partially covers said second user interface in said second and said fourth closed position to define a second closed position accessible portion and a fourth closed position accessible portion and a second closed position inaccessible portion and a fourth closed position inaccessible portion.

10. The handheld radiotelephone according to claim 9, wherein said third closed position accessible portion operates in said second mode to affect the operation of said third user interface operating in said second or said third mode or combination thereof, and wherein said fourth closed position accessible portion operates in said second mode to affect the operation of said third user interface operating in said first, said second, or said third mode or combination thereof.

11. The handheld radiotelephone according to claim 3, wherein a detachable user interface is attachably removable from its associated housing portion, and wherein said detachable user interface is one or more of said first user interface, said second user interface, and said third user interface.

12. The handheld radiotelephone according to claim 1, further comprising a fourth user interface mounted within said second housing portion accessible on said fourth face.

13. A handheld electronic device comprising:
   a housing comprising a first housing portion and a second housing portion;
   a controller mounted within said housing;
   a detachable user interface selectively attachable and detachable to said first housing portion;
   a first interconnect means mounted on and coupled to said detachable user interface;
   a second interconnect means mounted on said first housing portion and coupled to said controller, said second interconnect means for connecting to said first interconnection means when said detachable user interface is attached to said first housing portion; and
   a swivel hinge for coupling said first housing portion to said second housing portion such that said first housing portion and said second housing portion rotate about a first axis of said swivel hinge, and
   wherein said swivel hinge further couples said first housing portion and said second housing portion such that said first and said second housing portions rotate about a second axis of said swivel hinge perpendicular to said first axis, and
   wherein said swivel hinge allows said housing to configure to a first closed position, where said first housing portion and said second housing portion are folded together and planarly adjacent enclosing said detachable user interface therebetween, and a second closed position wherein said first housing portion and said second housing portion are folded together and planarly adjacent and said detachable user interface is outwardly accessible.

14. The handheld electronic device according to claim 13, wherein said detachable user interface further comprises an input means or an output means or a combination thereof.

15. The handheld electronic device according to claim 13, wherein said detachable user interface further comprises a hearing impaired input means, a hearing impaired output means, or a combination thereof.

16. The handheld electronic device according to claim 13 wherein said detachable user interface further comprises a vision impaired input means, a vision impaired output means or a combination thereof.

17. A handheld electronic device comprising:
   a housing, having a first housing portion and a second housing portion;
   a first user interface mounted in said first housing portion;
   a second user interface mounted in said second housing portion; and a hinge for coupling said first housing portion to said second housing portion such that said first housing portion and said second housing portion rotate about a first axis of said hinge between a first closed position, where said first housing portion and said second housing portion are folded together until they are planarly adjacent enclosing only said first user interface therebetween, and a first open position where said first and said second housing portions are angularly displaced about said first axis from said first closed position to an angle between 90 and 180 degrees, wherein said second housing portion partially covers said first user interface in said first closed position to define a first closed position accessible portion thereof and a first closed position inaccessible portion thereof, and wherein said swivel hinge further couples said first housing portion and said second housing portion such that said first and said second housing portions rotate about a second axis of said swivel hinge perpendicular to said first axis between a first housing portion first rotation position and a first housing portion second rotation position, as defined relative to said second housing portion, and between a second housing portion first rotation position and a second housing portion second rotation position as defined relative to said first housing portion, and wherein said first accessible portion of said first user interface of said housing in said first closed position is in said input operation mode, output operation mode or combination thereof and said inaccessible portion is in an inactive mode and said second user interface is in said input operation mode, said output operation mode, or a combination thereof, and wherein said first accessible portion of said first user interface of said housing in said first open position is in an input operation mode, output operation mode or combination thereof, and said inaccessible portion is in an input operation mode, output operation mode or combination thereof and said second user interface is in said input operation mode, said output operation mode, or a combination thereof.

18. The handheld radiotelephone according to claim 17, further comprising a controller coupled to said first user interface and said second user interface for generating and providing an operation mode signal thereto for control thereof in an input operation mode, an output operation mode or a combination thereof, and wherein said first closed position accessible portion is in said input operation mode, said output operation mode, or a combination thereof and said second user interface is in said input operation mode, said output operation mode or combination thereof.

19. The handheld radiotelephone according to claim 17, wherein said first closed position accessible portion in said input operation mode affects the operation of said second user interface in said output operation mode, and 20. The handheld radiotelephone according to claim 17, wherein said first closed position accessible portion in said input user interface mode extends operation of said second user interface in said output operation mode, input operation mode or a combination thereof.

21. The handheld electronic device according to claim 19, wherein said first closed position accessible portion operating in said second operation mode further comprises navigation buttons.

22. A portable handheld wireless communication device comprising:
a housing having a first housing portion and a second housing portion; and a swivel hinge coupling said first housing portion to said second housing portion, said first housing portion and said second housing portion rotateable about a first axis, and said first housing and second housing rotateable about a second axis, and said second axis is perpendicular to said first axis, said first housing portion and said second housing portion rotate to a first closed position wherein a first face of said first housing portion is planarly adjacent to a third face of said second housing portion and, wherein said first housing portion and said second housing portion rotate to a second closed position wherein said first face of first housing portion is planarly adjacent to a fourth face of said second housing portion, and wherein said first housing portion and said second housing portion rotate to a third closed position wherein a second face of said first housing portion is planarly adjacent to said third face of said second housing portion, and wherein said first housing portion and said second housing portion rotate to a fourth closed position wherein said second face of said first housing portion is planarly adjacent to said fourth face of said second housing portion.

23. The portable handheld wireless communication device of claim 22, rotates to a first open position wherein said first face of said first housing portion is angularly displaced from said third face of said second housing portion and, wherein said portable handheld wireless communication device rotates to a second open position wherein said first face of first housing portion is angularly displaced from said fourth face of said second housing portion, and wherein said portable handheld wireless communication device rotates to a third open position wherein said second face of said first housing portion is angularly displaced from third face of said second housing portion, and wherein said portable handheld wireless communication device rotates to a fourth open position wherein said second face of said first housing portion is angularly displaced from said fourth face of said second housing portion.

24. The portable handheld wireless communication device of claim 22, wherein the first, second, third and fourth face comprise at least one user interface disposed upon at least one of said first, second third or fourth face.

25. The portable handheld wireless communication device of claim 22, wherein said swivel hinge is a universal joint coupling said first housing portion to said second housing portion, and the universal joint comprises a first and a second perpendicular rotation axis.

26. The handheld wireless communication device of claim 25 wherein said universal joint couples a first end of said first housing to a second end of said second housing portion.

27. The handheld wireless communication device of claim 26 wherein said first housing portion has at least a first user interface disposed thereon, and wherein said second housing portion has at least one user interface disposed thereon.

* * * * *